Oct. 31, 1933.   B. P. GRAVES ET AL   1,932,546
MILLING MACHINE
Filed June 11, 1930   8 Sheets-Sheet 1

INVENTORS
Benjamin P. Graves
Walter A. Gigger
BY Barlow & Barlow
ATTORNEYS.

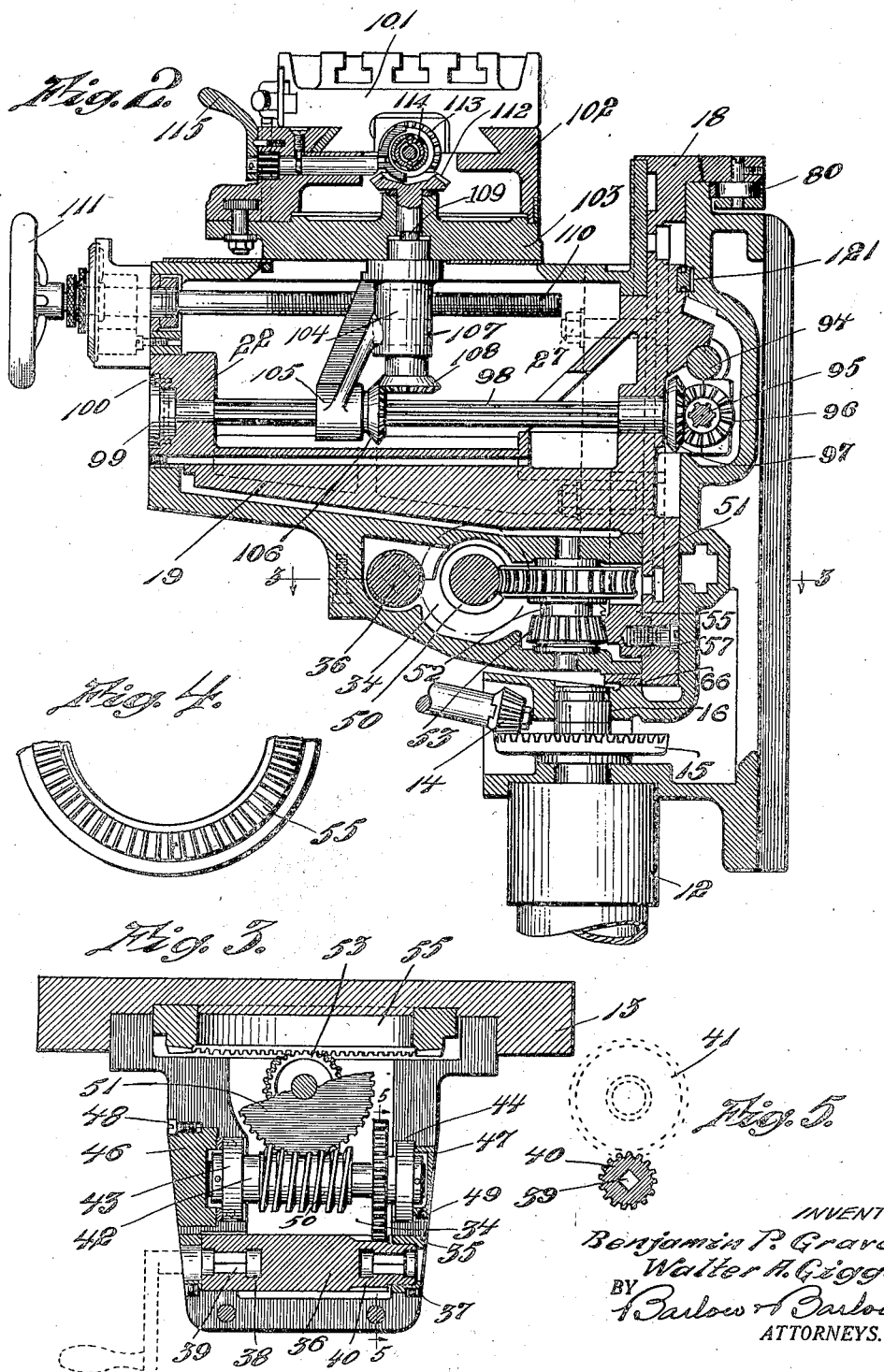

Oct. 31, 1933.  B. P. GRAVES ET AL  1,932,546
MILLING MACHINE
Filed June 11, 1930   8 Sheets-Sheet 3

INVENTORS
Benjamin P. Graves
Walter A. Gigger
BY Barlow & Barlow
ATTORNEYS.

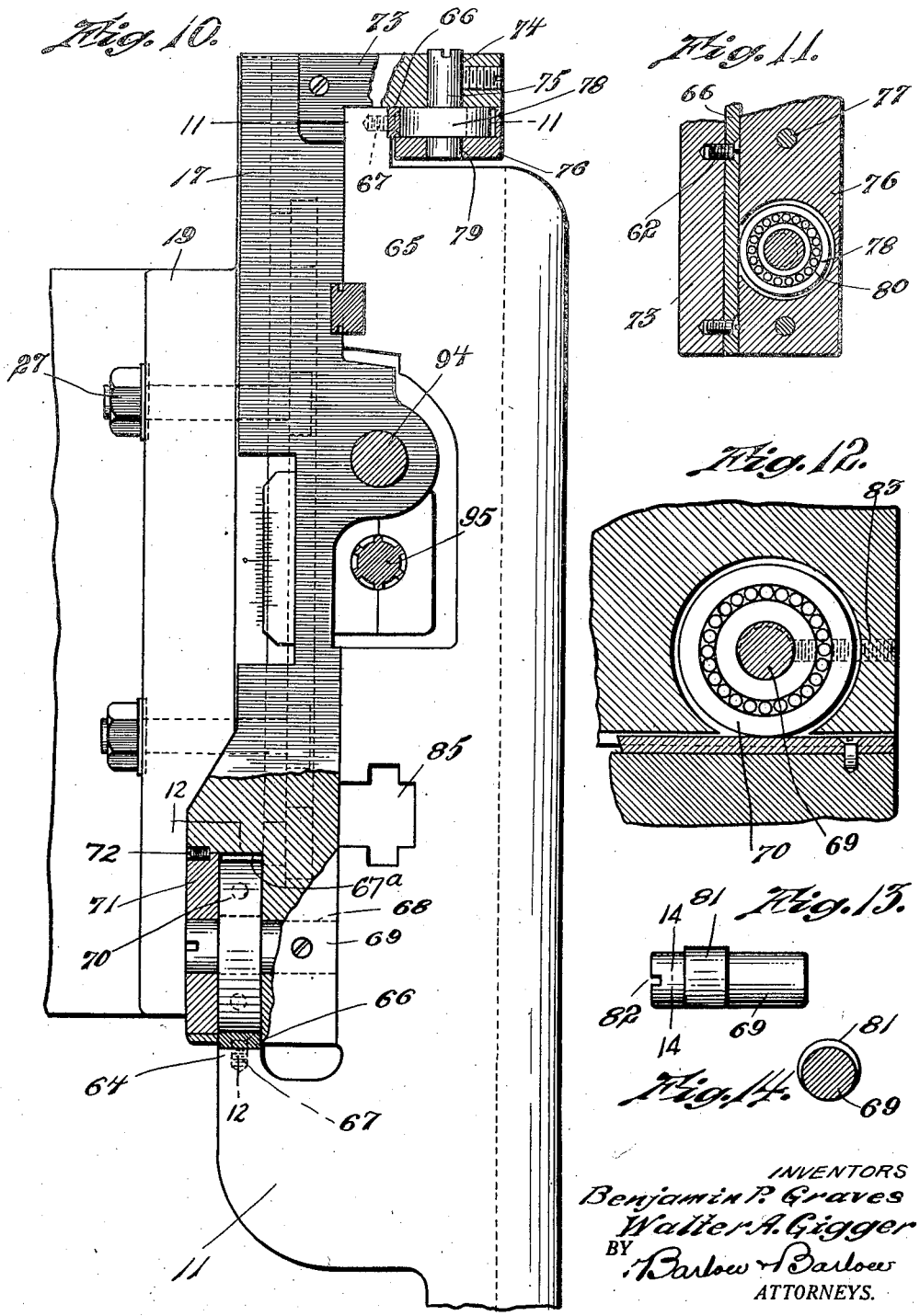

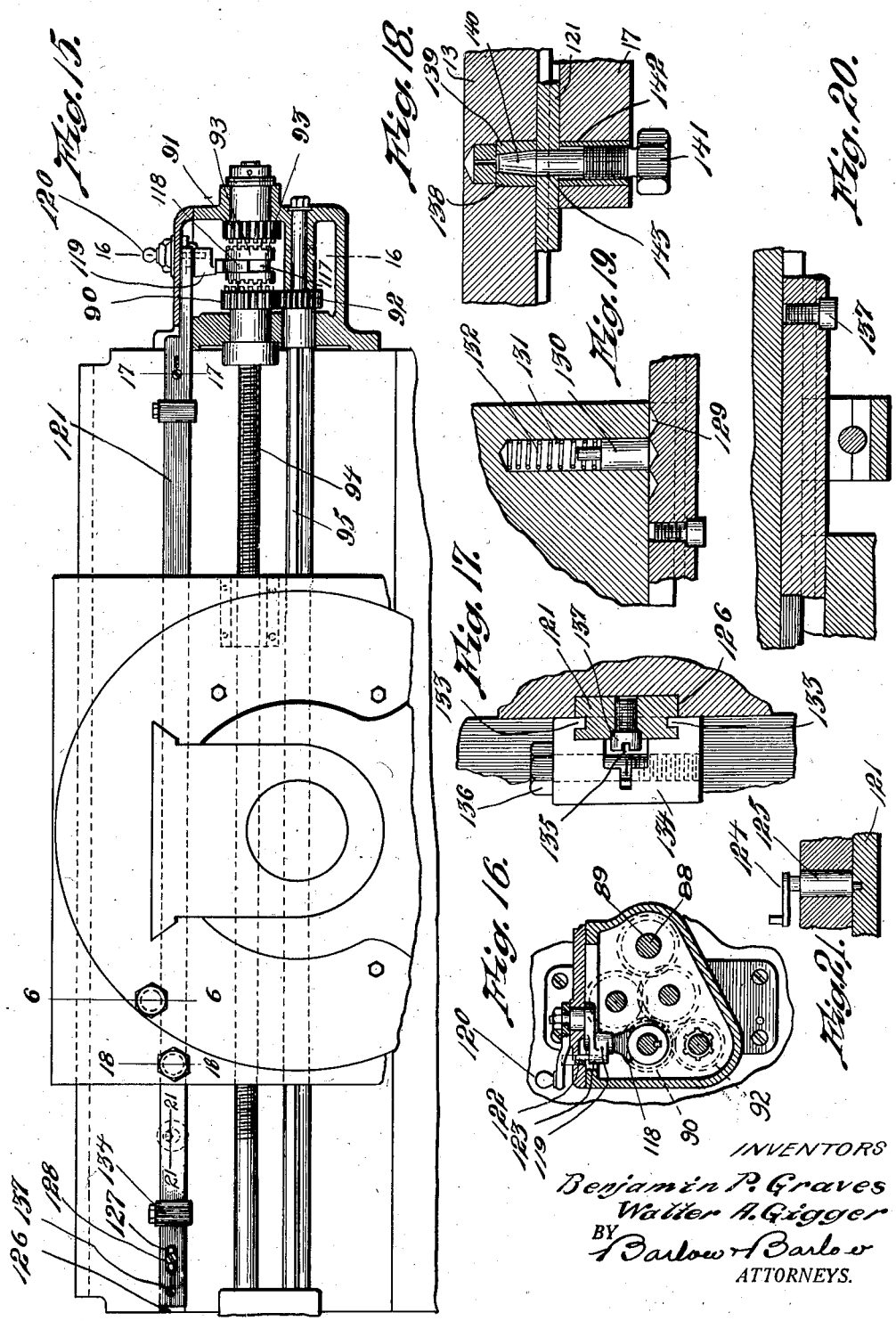

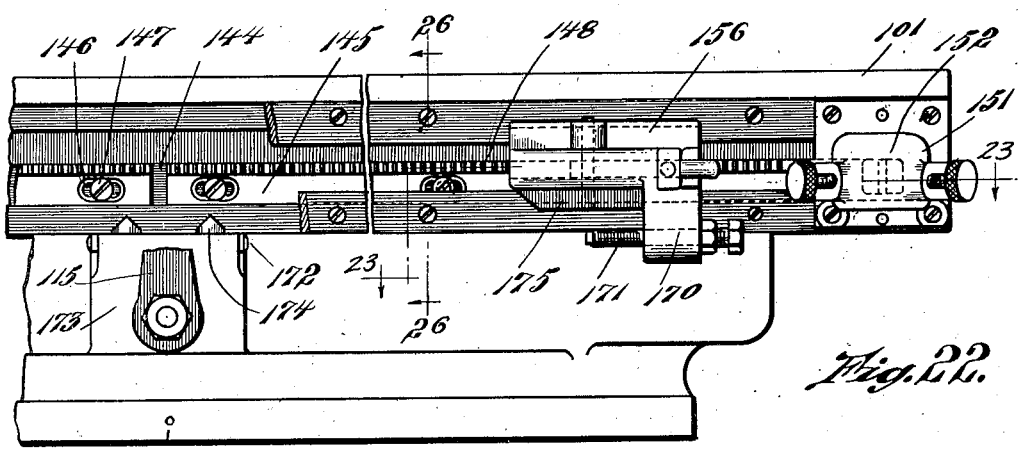
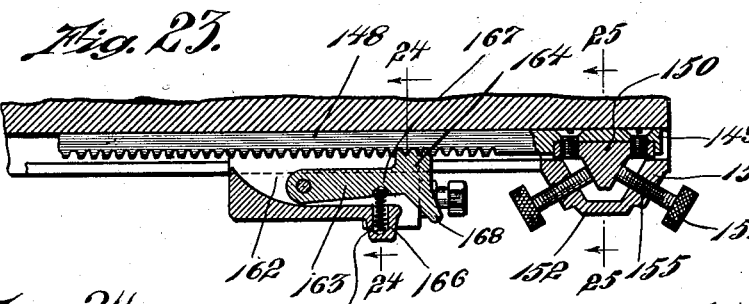
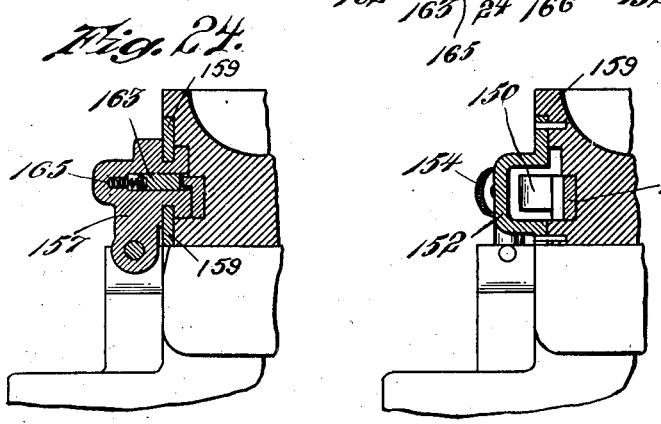
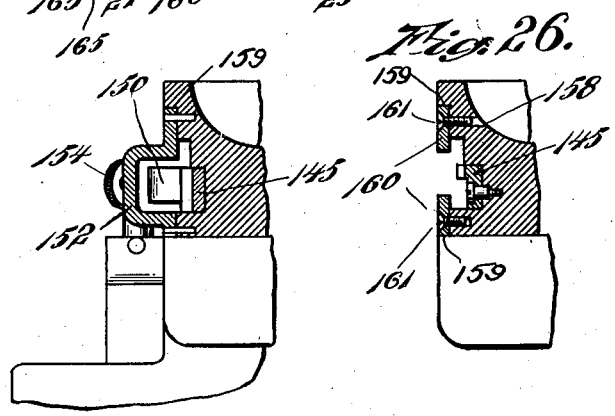

Oct. 31, 1933.  B. P. GRAVES ET AL  1,932,546
MILLING MACHINE
Filed June 11, 1930   8 Sheets-Sheet 7

INVENTORS
Benjamin P. Graves
Walter A. Gigger
BY Barlow & Barlow
ATTORNEYS.

Oct. 31, 1933.   B. P. GRAVES ET AL   1,932,546
MILLING MACHINE
Filed June 11, 1930   8 Sheets-Sheet 8

INVENTORS
Benjamin P. Graves
Walter A. Gigger
BY Barlow & Barlow
ATTORNEYS.

Patented Oct. 31, 1933

1,932,546

UNITED STATES PATENT OFFICE 1,932,546

MILLING MACHINE

Benjamin P. Graves, Edgewood, and Walter A. Gigger, Providence, R. I., assignors to Brown & Sharpe Manufacturing Company, Providence, R. I., a corporation of Rhode Island Application June 11, 1930. Serial No. 460,466

20 Claims. (Cl. 90—21)

Our present invention relates to milling machines, and has particular reference to the construction of milling machines of the universal type.

Milling machines of this type have not been truly universal in the sense that the work could be first clamped to the machine table and then adjusted in desired relation to the cutter by manipulation of the table and its supports. It has been necessary, in operating the usual commercial milling machine for taking a tapered vertical cut on work that is clamped to the table, to set or build up one side of the work with respect to the table.

Such building up is difficult, requires expert and skilled workmen, and takes a considerable amount of time and attention besides requiring a number of auxiliary blocks of different sizes for obtaining the necessary setting.

The principal object of our invention is to so construct the milling machine that the desired setting may be simply and effectively obtained through mechanical manipulation of the table and the table support.

The preferred construction utilizes a novel mounting of the knee so that it may be freely swivelled on a horizontal axis. Since the table as customarily constructed may be freely swivelled on a vertical axis, a simple manipulation of both the table and the knee on their respective swivels provides a truly universal setting.

A further difficulty with milling machines as heretofore constructed has been the limitation of speed of travel of the table, on account of the weight of the knee and table and the other associated parts. This limitation of speed has precluded a high table travel where a light cut was desired, and has therefore limited the available speed of operation and lowering of the operating cost. An additional object of our invention therefore consists in so constructing the various parts of the milling machine as to permit a very rapid motion of the table portion.

Another disadvantage of a milling machine of the usual type resides in the overhang resulting from milling work of considerable length. The usual practice, in order to avoid severe bending strains, is to mill a portion of the cut, and then fleet the work to continue the cut. This fleeting requires resetting of the work and the table, and thus increases the time of operation and introduces possibility of error in milling. An object of our invention is therefore to provide a knee and table construction which will reduce the overhang and permit a continuous cut.

This reduction of overhang is preferably obtained by providing simultaneous and independent movement of both the knee and the table. This translation of the knee and its swivelling construction, however, necessitated an adequate knee support which would securely hold the knee under operation conditions. A further object of the invention is therefore the construction of a knee support and a knee mounting adequate to securely hold the knee during both its swivelling and its linear movement.

The independent actuation of the knee and the table necessitates independent power controls and independent tripping mechanism for cutting off the power feed to both the knee and the table. In addition, centering mechanism to permit exact centering of the knee and of the table, and mechanism for locking the change feed gears in neutral position, should be provided to permit the proper control of the machine parts. Other objects of the invention are therefore to provide such additional mechanical controls, safety devices, centering devices, and adjusting devices as are necessary to permit the complete application and use of the novel knee construction.

With these and other objects and advantageous features in view, the invention therefore consists of certain novel arrangements of parts more fully described in the detailed description following, in conjunction with the accompanying drawings, and more particularly specified in the appended claims.

In the drawings:

Fig. 2 is a vertical section of the knee and table mounting;

Fig. 3 is a section on the line 3—3 of Figure 2;

Figure 4 is a detail of the swivel gear circular rack;

Fig. 5 is a fragmentary section on the line 5—5 of Figure 3;

Fig. 10 is an elevation, partly in section, showing the mounting of the knee support housing on the standard face plate;

Fig. 11 is a section on the line 11—11 of Figure 10;

Fig. 12 is a section on the line 12—12 of Figure 10;

Fig. 13 is a side elevation of the knee bearing roller shaft;

Fig. 14 is a section on the line 14—14 of Figure 13;

Fig. 15 is a front elevation, partly broken away, showing the knee screw control mechanism;

Fig. 16 is a section on the line 16—16 of Figure 15;

Fig. 17 is a section on the line 17—17 of Figure 15;

Fig. 18 is a section on the line 18—18 of Figure 15;

Fig. 19 is a horizontal section through the snap indicator recesses;

Fig. 20 is a horizontal section through the trip bar, showing the limit stop screw;

Fig. 21 is a horizontal section on the line 21—21 of Figure 15;

Fig. 22 is a front elevation, partly broken away, of the table trip mechanism;

Fig. 23 is a section on the line 23—23 of Figure 22;

Fig. 24 is a section on the line 24—24 of Figure 23;

Fig. 25 is a section on the line 25—25 of Figure 23;

Fig. 26 is a section on the line 26—26 of Figure 22;

The knee support

The knee mounting should rigidly support the knee for swivelling therein, and should also rigidly support the knee, whether swivelled or central, during lateral movement thereof. We have therefore devised a support which is securely mounted in a movable support housing and has bearings for receiving aligned front and rear cylindrical portions of the knee, thus permitting swivelling of the knee in the knee support. The preferred knee support construction may be termed of the "horn" type, the base of the horn being mounted in the support housing, and the front of the horn extending upwardly to provide the front knee bearing.

Figure 1:
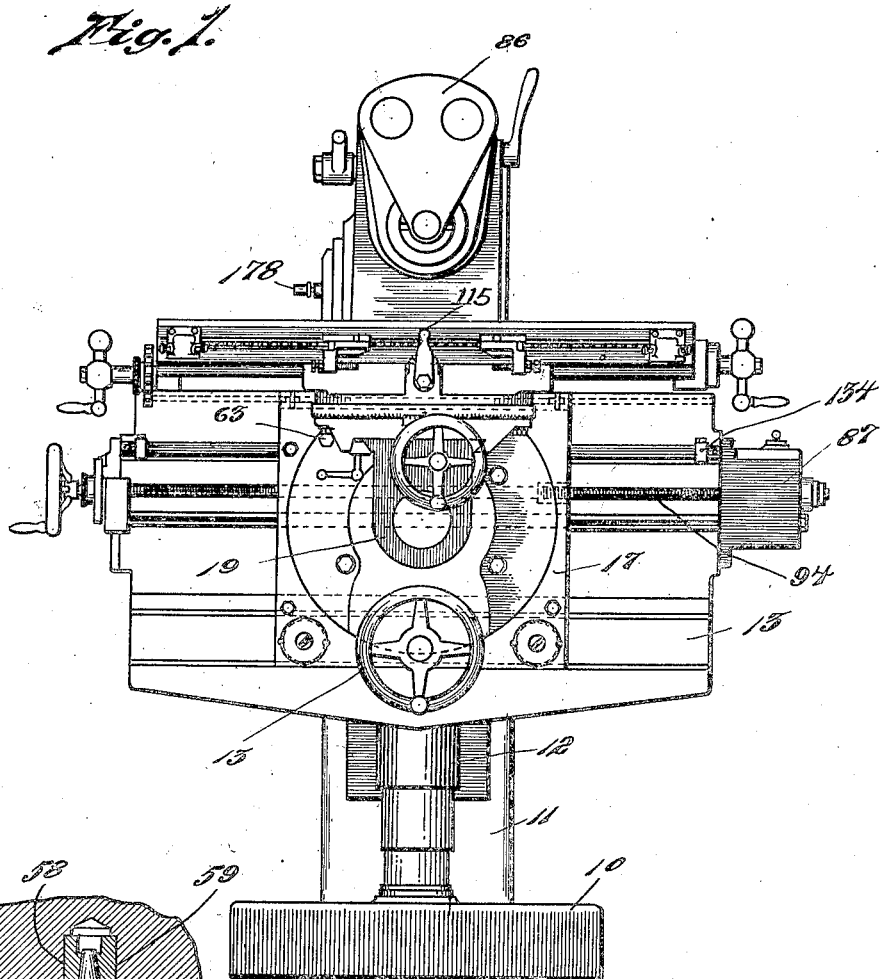
Fig. 1 is a front elevation of the improved milling machine.

The milling machine, as shown in Figure 1, has the usual base 10 upon which the standard 11 is mounted, and from which a telescoping knee screw column 12 projects upwardly to house the vertical knee screw. The vertical knee screw is shifted by turning the hand wheel 13, which rotates a bevel gear 14 meshing with a gear 15 keyed to the knee screw nut 16.

The knee mounting has a front face formed as a wide vertical face plate 17, which is equipped with guide rails and the like for slidably receiving the knee support 18 in which the knee 19 is rotatably mounted.

Figure 7:
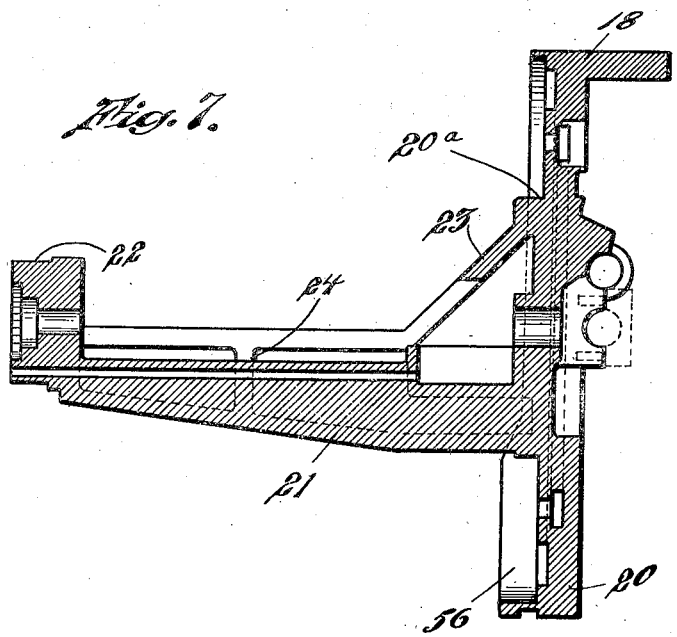
Fig. 7 is a vertical section through the knee support.
Figure 8:
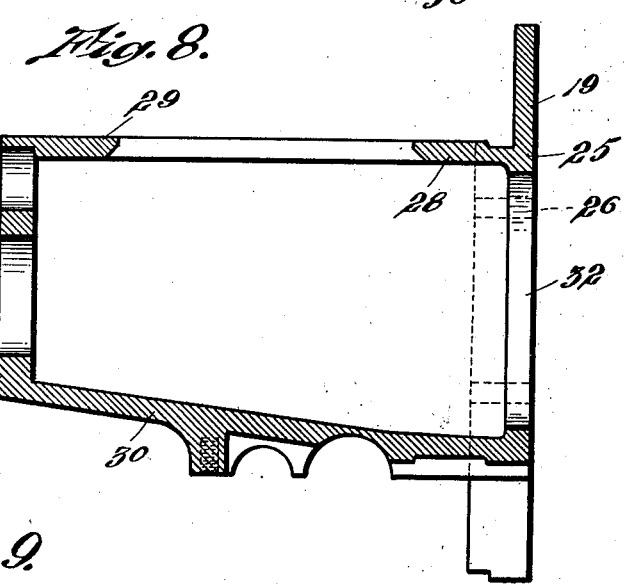
Fig. 8 is a vertical section through the swivel knee.
Figure 9:
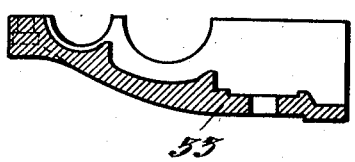
Fig. 9 is a vertical section of the base of the knee gear housing.

The knee mounting, as best shown in Figures 7, 8 and 9, includes the support 18, which has a vertical base 20, having a rear cylindrical bearing 20a, an extension 21, and an upstanding front cylindrical bearing 22; the support is generally in the form of a horn with diagonal strengthening braces 23 and vertical support ribs 24.

The knee 19 has a base plate 25, which is provided with openings 26 through which lock bolts 27 (see Figure 2) extend to releasably lock the knee to the knee support base, a hollow table portion 28, with its upper part 29 horizontal, and its lower part 30 rounded so as to snugly swing over the similarly rounded extension 21 of the support, and a vertical front plate 31 which has a cylindrical bore to rotatably receive the cylindrical bearing 22. The base plate 25 has a central bore 32 for mounting on the bearing 20a, and of a large diameter to facilitate mounting of the knee on its support, and the lower part 30 is formed to receive and cooperate with a detachable base 33 to provide a gear housing 34 in which the swivel gears are mounted.

The "horn" type of construction is preferred, as it provides a rigid and secure swivel mounting for the knee, and also provides a protecting housing for the swivel gears.

The swivel gearing

The swivel gearing should be easily accessible for manual operation, and should not require excessive manual force to affect the desired turning. We have therefore utilized a plurality of gears, including a worm and worm wheel, to permit easy swivelling, and have formed the gear to be initially turned, as a cylindrical member with a crank receiving socket at each end, the sockets being exposed on either side of the knee so as to be readily accessible to the operator.

As shown in Figures 2 to 5, the gear housing 34 has a transverse bore 35 in which a rotatable shaft 36 is held by two end collars 37 which are suitably secured in the bore 35, as by lock screws 37. The shaft 36 has a recess 38 at each end with a square bore 39 adapted to receive the correspondingly shaped end of a hand crank, and is provided with a toothed portion 40 adjacent one end which is in mesh (see Figure 5) with a gear 41 formed integral with or keyed to a transverse shaft 42; the shaft 42 is rotatably mounted in roller bearings 43 positioned in transverse bores 44 and held in place by external lock washers 45 which are pinned or otherwise secured to the shaft 42. The roller bearings are held against transverse movement by end bearings 46, 47 which are suitably locked in the bore 44, as by lock screws 48, 49.

The shaft 42 has a worm 50 preferably formed integral therewith, the worm 50 meshing with a worm wheel 51 which is keyed to the cylindrical flange 52 of a bevel gear 53; the gear 53 is rotatably mounted on a shaft 54 vertically positioned in the gear housing, and meshes with a fixed circular rack 55 which is locked in a circular slot 56 formed in the base 20 of the housing support, as shown in Figure 7, by screws or the like 57.

When the knee is to be swivelled, the bolts 27 are loosened, and the crank handle is inserted into the most accessible square bore 39, and turned, thus rotating the shaft 36, the gears 40, 41, the worm 50, the wormwheel 51, and the bevel gear 53. The rotation of the bevel gear 53 on the fixed rack 55 swings the knee in its support.

Figure 6:
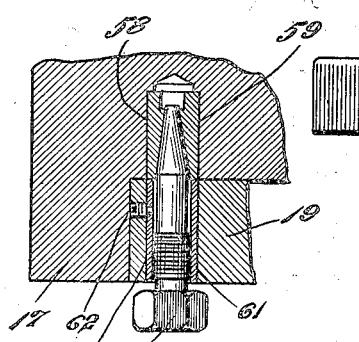
Fig. 6 is a section through the knee centering bolt and contiguous parts, on the line 6—6 of Figure 15.

If desired, the knee may be quickly and accurately centered in the knee support by utilizing the centering means shown in Figure 6. The knee support 17 has a bore 58 equipped with a tapered centering plug 59, and the knee 19 has a bore 60 in which a threaded liner 61 is locked, as by means of a lock screw 62. A tapered centering bolt 63 may be threaded into the liner 61 to engage the centering plug 59, thus securely locking the knee to the knee support in its central position.

The described swivel gearing therefore facilitates swivelling of the knee, as the crank sockets are easily accessible and the crank end may be inserted in either one. In addition, the knee may be easily brought back to exact central position and locked in the central position, if desired.

The knee support mounting

The knee support not only carries the knee and its swivel mechanism, but is also reciprocated by the power mechanism. This heavy duty requires a mounting which will properly support the load without play and without undue friction, and which may be properly adjusted to compensate for wear. We have therefore devised a mounting which provides a direct bearing for supporting the weight of the knee, the knee support, and the associated parts, and an overhanging bearing for resisting bending strains; these bearings include roller bearings which engage wear strips of hardened steel, and are adjustable so as to compensate for wear and for the unavoidable differences in alignment produced by slight variations in machining and the like.

Referring to Figures 10 to 14, the face plate is machined to provide a horizontal rail 64 and a vertical rail 65, the vertical rail being rearwardly positioned with respect to the horizontal rail. Each rail is provided with a hardened steel track 66 secured to the rail by any suitable means, such as screws 67 or the like.

The lower portion of the knee support is formed with a plurality of spaced recesses 67a and aligned bores 68, to accommodate roller shafts 69 on which are mounted ball bearing rollers 70. Each ball bearing roller is locked in place, preferably by an annular retained cap 71 which is secured in position in the recess 67 by a lock screw 72 or the like.

Referring now to the overhang bearing, the knee support 17 has an overhanging arm or ledge 73 formed with a plurality of spaced bores 74 which are each adapted to receive a roller bearing shaft 75 therein. A roller housing plate 76 is secured to the lower side of the ledge 73 by suitable screws 77 or the like, and has spaced roller receiving recesses 78 and shaft receiving bores 79 which are in alignment with the bores 74 of the overhanging ledge. Each shaft 75 has a ball bearing roller 80 mounted thereon.

The shafts 69 and 75 are provided with mechanism for adjusting the bearing of the rollers with respect to the knee support. This mechanism includes an eccentric portion on the shaft, which as illustrated on shaft 69 is designated as 81 in Figure 13; each shaft 75 has a similar eccentric portion upon which the roller is mounted. One end of each shaft has a kerf 82 by means of which the shaft may be turned, thus turning the eccentric and shifting the relative position of the roller; the shaft is locked in the desired setting by means of a lock screw 83 or the like, as shown in Figure 12.

Lock bolts may be passed through suitable bores in the knee support, their heads being positioned in a T-shaped lock slot 85 in the face plate (see Figure 10) to securely lock the knee support to the plate at a desired relative position.

Referring now to Figure 2, it will be noted that the larger portion of the weight of the knee and its associated parts are carried by the lower rollers which engage the hardened strip 66; these rollers are therefore of large size. The upper rollers 80 resist the horizontal component of the weight, and need not be as large as the lower rollers.

The roller bearings and the hardened steel track strips greatly reduce friction and facilitate free movement of the knee and its parts. In addition, the adjustable eccentric mountings aid in the assembly of the parts, as all inequalities in machining and the like are easily compensated for; the rollers are also quickly adjusted for wear, and may be easily replaced whenever necessary.

The power gearing

The power gearing is in general similar to the power gearing of milling machines of the semi-universal type; but we have devised an improved gearing which provides an independent actuation for both the knee and the table, thus reducing overhang and affording increased table travel whenever desired.

When an extra long cut is being taken in the work, the table support may be moved along beneath the table to better support it in extended position, thus reducing the table overhang and eliminating the necessity for returning the table to starting position and fleeting the work for a continuation of the cut. This avoids the excessive overhang occuring in the old type of milling machine, and increases the accuracy of milling, as the work is not reset on the table.

The use of a separate and independent power gearing for the translation of the knee and the table also permits close regulation of the actual speed of the work with respect to the milling cutter; the combination of the two translations and the horizontal swivelling of the table is particularly effective when cutting screw threads and the like.

Referring to Figures 1, 2, 15 and 16, the machine head 86 has the usual power control switches, and in conjunction with the standard 11 contains the usual change speed gearing which is operatively connected to the main feed shaft in the gear box 87. This main feed shaft, designated as 88 in Figure 16, rotates a gear 89 keyed thereon, which gear positively drives the two knee screw gears 90, 91 in opposite directions, and also positively drives the table drive gear 92, which is in mesh with gear 90. A rotatable clutch 93 is splined to the knee feed screw 94, and is shiftable as hereinafter described to be selectively clutched with either gear 90 or 91 and thus drive the knee screw in either direction.

The table drive gear 92 is keyed to the table drive shaft 95, which as shown in Figure 2 is provided with splines or ribs which serve as keys for a correspondingly grooved bevel gear 96 rotatably mounted in the knee support and movable therewith; the bevel gear 96 meshes with a bevel gear 97, also rotatably mounted in the knee support, and splined or keyed to the table cross shaft 98. The end of the table cross shaft is rotatably mounted in the front swivel knee bearing 22, and is locked in place by a lock cap 99 or the like, preferably secured to the bearing 22 by screws 100.

The table 101 is mounted for reciprocatory movement on the saddle 102, which in turn is swivelled on the clamp bed 103; the clamp bed is mounted for reciprocatory movement on the knee. The clamp bed has a gear bearing element 104 secured therein, with a horizontal gear bearing portion 105 in which a bevel gear 106 is mounted in splined relation to the table cross shaft 98, and a vertical gear bearing portion 107 in which a bevel gear 108 is mounted in engagement with the gear 106, the gear 108 being keyed to a vertical shaft 109 for conveying power to the table feed screw. The vertical bearing portion 107 has a threaded bore extending transversely therethrough, in which a transverse table cross screw 110 is received; the cross screw is mounted in the knee support in the usual manner, for rotation upon manual turning of the cross feed hand wheel 111.

A bevel gear 112 is keyed to the upper end of the shaft 109, and meshes with the table bevel gear 113, which rotates the table feed screw 114 in either direction in the usual manner, through a hand clutch control lever 115.

When the power is turned on by pressing the usual switch control button in the machine head, the main feed shaft 88 rotates the knee feed screw gears 90 and 91, and also the table drive shaft 95. The knee feed screw may be manually clutched so as to drive the knee in either direction, and the table drive shaft rotates the table bevel gear 113 through the table cross drive shaft and the vertical shaft 109, and therefore reciprocates the table in either direction, as desired; the direction is controlled through the table feed screw clutch by manual shifting of the hand control lever 115.

The knee feed control

We have devised a knee feed control which includes a shiftable clutch; the clutch may be manually or mechanically shifted so as to hold the knee feed screw actuating mechanism in neutral or to rotate the knee feed screw in either direction. The manual control is preferably actuatable from either the right or the left of the machine, and includes a snap indicator to hold the knee feed control in shifted position. Besides the usual adjustable mechanical trip, a limit stop mechanism is provided to ensure stoppage of the actuating mechanism in the event that the mechanical trip fails to hold. A neutral locking device may also be utilized to lock the knee feed control in neutral position.

These features are illustrated in Figures 15 to 21. As shown in Figure 15, the shiftable clutch 93 is keyed to the knee feed screw and has a central groove 117 in which the actuating finger 118 of a rotatable control 119 is positioned. The control 119 is turned by manual rotation of the hand crank 120, which is pivotally mounted on the knee so as to be accessible from the front of the machine, or by sliding movement of the trip bar 121, which has a pin 122 mounted therein and engaging an arm 123 which is integral with or forms part of the control 119. As shown in Figure 21, a manually engageable crank 124 is mounted at the rear of the machine, and is operatively connected to the trip bar 121 through an eccentric drum 125 mounted in the knee support; this construction permits shifting of the clutch 93 from either the right or the left of the machine, as is found most convenient.

The trip bar 121 is generally of rectangular form, and is slidably mounted in a horizontal groove 126 in the vertical face plate; a plurality of slots 127 in the bar and cooperating screws 128 mounted in the groove 126 serve to maintain the bar in the groove. As shown in Figure 19, the bar has three longitudinally spaced recesses 129 into which a plunger 130 is selectively adapted to seat, the plunger 130 being slidably mounted in a cylindrical bore 131 of the face plate, and being pressed outwardly by a coil spring 132. The three recesses are spaced so as to correspond to the three positions of the clutch 93, when meshing with the gears 90 and 91 and when in neutral.

The upper and lower edges of the trip bar 121 are longitudinally grooved to receive the inwardly extending ends 133 of trip dogs 134 which are slidingly mounted on the bar, each trip dog having a central recess 135 and a clamp bolt 136 which may be tightened to draw the ends of the trip dog towards each other and thus lock the trip dog in desired position on the trip bar.

The trip bar has a limit stop screw 137 threaded therein at each end, which is smaller than the recess 135, to permit passage of the trip dog thereover, but is large enough to be positively engaged by the side of the knee if the clamp bolt 136 works loose for any reason and releases the trip dog. The vertical face plate is provided with a bore 138, see Figure 18, in which a centering plug 139 is secured, the plug 139 being adapted to receive the conical end 140 of a centering pin 141 which is threadedly secured to the knee by engagement with a threaded bushing 142, and which passes through a bore 143 provided in the bar 121.

The trip bar being secured by the screws 128 in the groove 126 in shiftable relation to the face plate, the trip dogs, which are slidable over the bar ends, may be set at any desired position. Engagement of one or the other trip dog by the adjacent side of the knee shifts the trip bar and therefore the clutch 93 to neutral position, the plunger 130 snapping into the central recess 129 to lock the trip bar in neutral. If the trip dog is loose, the limit stop screw 137 will perform the functions of the trip dog.

The transverse movement of the table may be resumed by manual turning of crank 120 or crank 124, whichever is most convenient for the operator. The knee may be set and locked in central position by use of the lock pin 141, which passes through the bore 143 in the trip bar and thus positively locks the knee feed screw in neutral.

The described arrangement therefore provides a simple, effective, and easily manufactured trip mechanism for controlling the knee traverse. The direction of traverse is preferably manually controlled, the trip mechanism returning and positively retaining the knee feed screw clutch in neutral. The shifting of the knee screw clutch to continue or reverse the traverse may be controlled from either side of the machine, as described, and the knee may be locked in central position, such locking also simultaneously locking the knee feed screw clutch in neutral.

The table trip mechanism

The universal movement of the table requires a trip mechanism which may be set with great accuracy, and which has both a mechanical and a hand stop adjustment. We have therefore devised a table trip mechanism which utilizes two trip dogs independently adjustable, with both power and hand stops, and movable to lock the table in central position, if desired.

Referring to Figures 22 to 26, the table 101 has a longitudinal groove 144 in which two rack bars 145 are slidably mounted, each rack bar having a plurality of slots 146 through which locking screws 147 pass to engage with the table body. Each rack bar has a rack portion 148 extending along the length thereof, and a recessed portion 149 at one end in which a large setting tooth 150 is detachably secured.

A dog setting device is positioned adjacent each tooth 150, and consists of a base portion 151 which is secured to the table and an upstanding portion 152 which has tapered sides 153 and is shaped to conform with and to be spaced from the tooth 150. Two adjusting screws 154 are inserted in threaded bores 155 in the sides 153 of each setting device, and engage with the sides of the tooth 150.

The table trip dogs 156 are of the pivoted type, each comprising a body member 157 shaped to fit into a groove 158 in the table so as to contact with the rack bar 145; the body member has aligned grooves 159 in the upper and lower sides into which locking guide plates or rails 160 extend, these rails being secured to the table body, as by screws 161 or the like. A horizontal groove or slot 162 is provided in each body member 157, in alignment with the rack 148, and a catch 163 is pivotally mounted in the groove 162 and has a toothed portion 164 engageable with the teeth of the rack; a spring 165 is housed in a suitable bore 166 in the body member and engages a recess 167 in the catch to yieldingly urge the catch inwardly into engagement with the rack.

Each catch has an outwardly extending tooth or projection 168 which may be manually engaged to free the catch when setting the trip dog at any desired point along the rack bar. In addition to the catch, each body member has a depending portion 170 in which a stop screw 171 is horizontally mounted; this stop screw is engageable with a stop abutment 172 on the fixed trip block 173 in which the control pins 174 and the control lever 115 are mounted. The body member has the usual pin engaging and depressing rib 175.

In setting the trip dogs, the projections 168 are lifted to set the dogs at the approximate desired location, and the screws 154 are then turned to accurately shift the rack bars and dogs to the exact location. In operation, the depressing ribs 175 normally depress the pins 174, which shift the table gears to neutral in well-known manner, the ribs 175 then permitting additional hand feed of the table until the limit stop screws 171 are in contact with the abutments 172. The length of the stop screw 171 is necessarily fixed to permit initial tripping of the pins 174. If desired, the two trip dogs may be shifted until the two stop screws are against their abutments, thus locking the table on the knee, and at the same time locking the table screw in neutral, as the ribs 175 maintain the trip pins 174 in depressed condition.

The gear lock

It has been found desirable, in view of the number of controls in the novel milling machine, to positively lock the change feed gears in neutral position whenever desired. The rotation of the change feed handle has heretofore, at intermediate change speed position, produced a neutral or "no-mesh" condition, but no positive stop has been heretofore used to lock the handle in such "no mesh" position. We have therefore provided a positive lock for this position.

Figure 27:
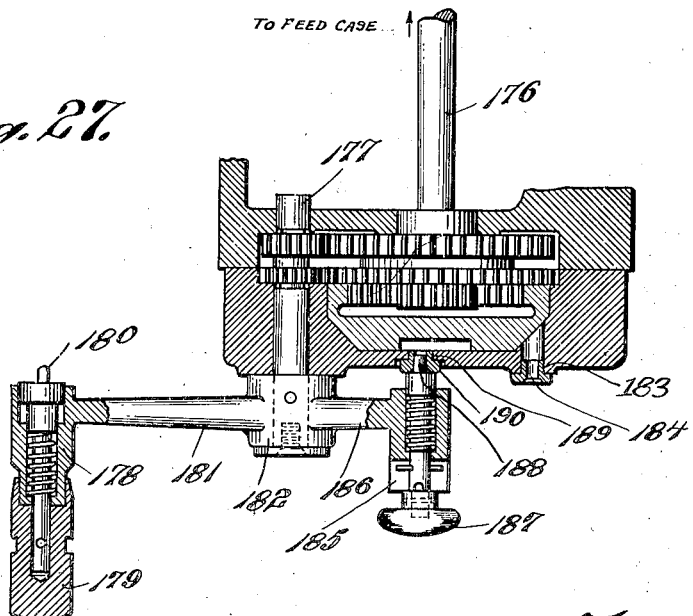
Fig. 27 is a horizontal section showing the change feed control lever.
Figure 28:
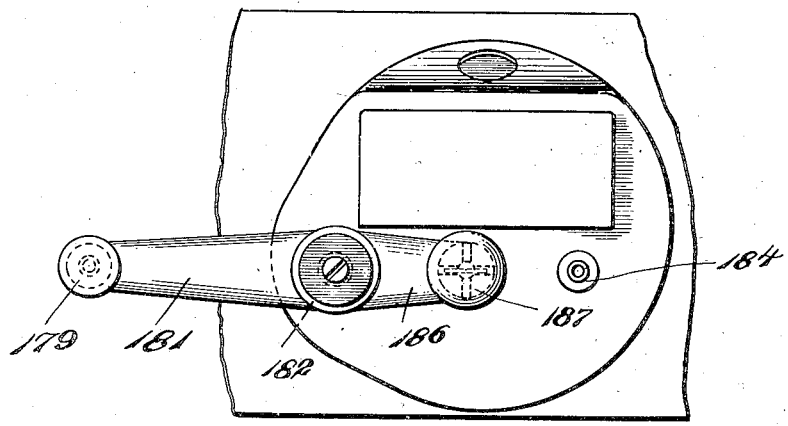
Fig. 28 is an elevation showing the change feed control lever in neutral.

Referring to Figures 27, 28, the control shaft 176 which leads to the feed case, is operatively geared to the control handle shaft 177, which is turned upon rotation of the control handle 178.

The control handle includes a manual grip 179 in which a spring pressed lock pin 180 is mounted, an arm 181, and a bored hub 182 which is pinned to the shaft 177. The machine head is provided with a bore 183 in which a hardened bushing 184 is mounted, spaced so as to receive the lock pin 180 when the handle is rotated to bring the change speed gears in mesh.

An auxiliary handle 185 is preferably formed integral with the control handle, and includes an arm 186 which extends from the hub 182 in alignment with the arm 181, and a grip portion 187 in which a spring pressed lock pin 188 is mounted. The machine head has a second bore 189 in horizontal alignment with the first bore 183 and in which a hardened bushing 190 is mounted, spaced so as to receive the lock pin 188 when the control handle is rotated to the position where the change feed gears are out of mesh.

This construction therefore provides a positive lock for both the "in mesh" and "out of mesh" positions of the control handle, and thus eliminates all danger of power operation when it is desired to manually manipulate the knee and the table.

The general operation

The milling machine as described is truly universal, and may therefore be used to accurately produce desired angular cuts by simple manipulation of the table and the knee swivels. The various controls and locks are specifically designed to facilitate the necessary manipulation and, as described above, include locks which may be utilized to change the milling machine to conform to the heretofore used types.

Figure 30:
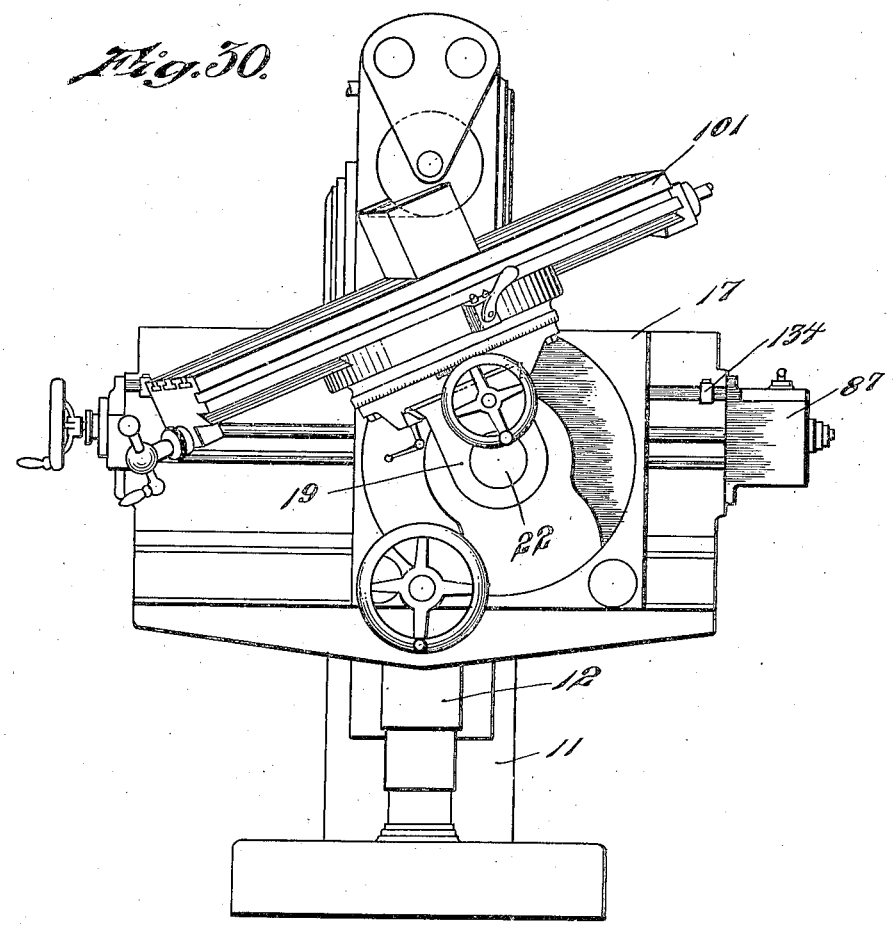
Fig. 30 is a view of the mounting for making a tapered angular cut at high speed.
Figure 29:
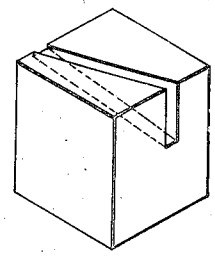
Fig. 29 is a perspective view of a work block showing a tapered angular cut.

The operation of the novel machine may best be described by considering the making of a difficult milling cut. Thus, Figure 30 shows a block in which a tapered angular cut is to be formed. The previous practice in forming such a cut has been to position the block on the table, swivel the table horizontally, and then build up one end of the block until the line of the desired lower edge of the cut became horizontal. This building up required skilled workmen, the use of a tool-maker's vise or a plurality of props or blocks of different heights, and a great amount of care in clamping the work and in forming the cut.

When using a machine constructed in accordance with the principles of our invention, the change feed handle is first locked in neutral position if hand operation is desired. The work is first clamped to the table, and the table is swivelled to obtain the desired angularity; the knee is then swivelled to obtain the desired taper. Both swivelling movements are vernier controlled, thus permitting great accuracy in setting. The knee and the table trip dogs are then adjusted.

If the work piece is of great length, the knee may be shifted to follow the table in order to eliminate excessive overhang of the table in the saddle. In many cases, also, the two swivelling constructions facilitate the making of a plurality of cuts in a single work piece, without disturbing the setting of the work piece on the table. Moreover, the independent knee and table translation, and the horizontal swivelling of the table, greatly facilitate the use of the milling machine for cutting screw threads.

In making the cut, if great speed is desired, both the knee and the table are moved in the same direction, thus permitting a very large range in the speed of the machine. In addition, the table trip dog permits a final hand feed so as to more positively control the last portion of the cut.

The other described details of construction all facilitate the universal operation. Thus, the use of two swivel handle sockets, one on each side of the knee, facilitates swivelling; the use of two hand crank controls for the knee trip bar permits power control of the knee from either the front or the rear of the machine; and the lock bolts permit quick and accurate centering of the knee and the table.

While the description is that of a specific form of milling machine which embodies the principles of our invention, it is obvious that desired changes in proportion and in arrangement of parts, suitable for different types and sizes of milling machines, may be made without departing from the spirit and the scope of the invention as defined in the appended claims.

We claim:

1. In a milling machine, a standard, a milling head mounted on said standard, a face plate on said standard, a knee support mounted for reciprocating movement on said plate, a knee mounted on said support, a table mounted for both swivelling and reciprocating movement on said knee, said knee and table mounted to swivel in different planes and power gearing for reciprocating said knee support and table, said gearing comprising a main feed shaft on the standard, a knee support feed screw parallel to the main feed shaft, a table drive screw parallel to the main feed shaft, and means for connecting the main feed shaft to the knee support feed screw and the table drive screw.

2. In a milling machine, a standard, a face plate on said standard, a knee support mounted for reciprocating movement on said plate and extending outwardly from said plate and said support having bearing surfaces adjacent the inner and outer ends thereof, a knee mounted for swivelling movement on said bearing surfaces, a table mounted for swivelling and for reciprocating movement on said knee, and power gearing for reciprocating said knee support and table, said gearing comprising a main feed shaft on the standard, a knee support feed screw parallel to the main feed shaft, a table drive screw parallel to the main feed shaft, and means for connecting the main feed shaft to the knee support feed screw and the table drive screw.

3. In a milling machine, a standard, a face plate on said standard, a horizontally disposed weight support rail on said face plate, a vertical flange on the upper portion of said face plate having a rearwardly positioned vertical support rail, a knee support having an overhanging portion extending over said flange, ball bearing rollers set in the base of said knee support and in said overhanging portion and contacting with said rails, and means for adjustably compensating for wear between the rollers and both of the support rails.

4. In a milling machine, a standard, a face plate on said standard, a horizontally disposed weight support rail on said face plate, a vertical flange on the upper portion of said face plate having a rearwardly positioned horizontal support rail, a knee support having an overhanging portion extending over said flange, adjustable eccentric shafts mounted in the base of said knee support and in said overhanging portion, and ball bearing rollers rotatably mounted on said shafts and contacting with said rails.

5. In a milling machine, a standard, a milling head mounted on said standard, a face plate, a knee mounted for reciprocating movement in a horizontal plane on said face plate, power gearing for reciprocating said knee, a clutch control for said power gearing, and trip means for actuating said clutch control after a predetermined knee travel, said trip means comprising a trip bar slidably mounted in the face plate and operatively connected to the clutch control, and a trip dog adjustably positioned on said bar and engageable by the knee after a predetermined knee travel.

6. In a milling machine, a standard, a milling head mounted on said standard, a face plate, a knee mounted for reciprocating movement on said face plate, power gearing for reciprocating said knee, a clutch control for said power gearing, trip means for actuating said clutch control after a predetermined knee travel to bring said power gearing to neutral position, and manually operable means for actuating said clutch control to bring said power gearing again into operation, said trip means comprising a trip bar slidably mounted in the face plate and operatively connected to the clutch control, and a trip dog adjustably positioned on said bar and engageable by the knee after a predetermined knee travel.

7. In a milling machine, a standard, a milling head mounted on said standard, a face plate, a knee mounted for reciprocating movement on said face plate, power gearing for reciprocating said knee, a clutch control for said power gearing, trip means for actuating said clutch control after a predetermined knee travel to bring said power gearing to neutral position, and manually operable means accessible from both front and rear of the machine for actuating said clutch control to bring said power gearing again into operation, said trip means comprising a trip bar slidably mounted in the face plate and operatively connected to the clutch control, and a trip dog adjustably positioned on said bar and engageable by the knee after a predetermined knee travel.

8. In a milling machine, a standard, a milling head mounted on said standard, a face plate, a knee mounted for reciprocating movement on said face plate, power gearing for reciprocating said knee, a clutch control for said power gearing, a trip bar slidingly mounted in said face plate and operatively connected to said clutch control, trip dogs adjustably positioned on said bar and engageable by said knee, and hand cranks mounted on the right and the left of said machine and operatively connected to said trip bar.

9. In a milling machine, a standard, a milling head mounted on said standard, a face plate, a knee mounted for reciprocating movement on said face plate, power gearing for reciprocating said knee, a clutch control for said power gearing, means for locking said knee in central position, means for locking said clutch control in neutral position.

10. In a milling machine, a standard, a milling head mounted on said standard, a face plate, a knee mounted for reciprocating movement on said face plate, power gearing for reciprocating said knee, a clutch control for said power gearing, a trip bar slidingly mounted in said face plate and operatively connected to said clutch control, trip dogs adjustably positioned on said bar and engageable by said knee, and stop screws fixed on said bar and engageable by said knee.

11. In a milling machine, a standard, a milling head mounted on said standard, a face plate, a knee mounted on said face plate, a table mounted for reciprocating movement on said knee, power gearing for reciprocating said table, a movable trip bar on said table, a trip dog adjustably mounted thereon, and means for adjusting the position of said dog by shifting said bar.

12. In a milling machine, a standard, a milling head mounted on said standard, a face plate, a knee mounted on said face plate, a table mounted for reciprocating movement on said knee, power gearing for reciprocating said table, a movable rack bar on said table, a trip dog having a pivoted catch releasably engaging the teeth of said bar, a shift element secured to said bar, and setting mechanism mounted on said table and engaging opposite sides of said shift element and adjustable to shift said bar.

13. In a milling machine, a standard, a milling head mounted on said standard, a face plate, a knee mounted on said face plate, a table mounted for reciprocating movement on said knee, power gearing for reciprocating said table, a trip dog adjustably mounted on said table, a power gearing control element on said knee engageable by said trip dog, a fixed abutment on said knee, and a stop element on said trip dog engageable with said fixed abutment.

14. In a milling machine, a standard, a milling head mounted on said standard, a face plate, a knee mounted on said face plate, a table mounted for reciprocating movement on said knee, power gearing for reciprocating said table, means for locking said table on said plate, and means for locking said power gearing in neutral position.

15. In a milling machine, a standard, a knee support on said standard, a knee mounted for swivelling movement on said support, and means for centralizing and locking said knee in position, said means comprising a tapered centering plug in the knee support, a threaded liner in the knee in line with the plug, and a lock screw passing through the liner into the centering plug.

16. In a milling machine, a standard, a knee support on said standard, a knee mounted for swivelling movement on said support, and a lock device for locking said knee in central position on said support, said means comprising a tapered centering plug in the knee support, a threaded liner in the knee in line with the plug, and a lock screw passing through the liner into the centering plug.

17. In a milling machine, a standard, a knee means for swivelly mounting said knee on said standard, a saddle mounted for reciprocating movement on said knee and a table mounted for reciprocating movement on said saddle.

18. In a milling machine, a standard, a knee, means for swivelly mounting said knee on said standard, and a saddle mounted for reciprocating swivelling movement on said knee and a table mounted for reciprocating movement on said saddle.

19. In a milling machine, a standard, a face plate on said standard, a knee, means for mounting said knee on said plate for reciprocating movement relative to said plate and power means for continuously reciprocating said knee.

20. In a milling machine, a standard, a face plate on said standard, a knee support, a knee, means for mounting said knee on said support for reciprocating movement relative to said plate, and power means for continuously reciprocating said knee.

BENJAMIN P. GRAVES.
WALTER A. GIGGER.